United States Patent [19]
Eberts

[11] 3,980,491

[45] Sept. 14, 1976

[54] BISMUTH OXYCHLORIDE-MICA NACREOUS PIGMENTS WITH ENHANCED LUSTER AND DISPERSIBILITY

[75] Inventor: Robert E. Eberts, Mahopac, N.Y.

[73] Assignee: The Mearl Corporation, Ossining, N.Y.

[22] Filed: Dec. 1, 1975

[21] Appl. No.: 636,791

Related U.S. Application Data

[63] Continuation of Ser. No. 449,032, March 7, 1974, abandoned.

[52] U.S. Cl.................................. 106/291; 106/300; 106/308 B; 106/DIG. 3; 428/363; 428/403
[51] Int. Cl.$^2$............................................ C09C 1/00
[58] Field of Search........ 106/291, 299, 300, 308 B, 106/DIG. 3; 428/403, 363

[56] References Cited
UNITED STATES PATENTS

| | | | |
|---|---|---|---|
| 3,597,250 | 8/1971 | Rands et al. | 106/291 |
| 3,634,119 | 1/1972 | Klenke | 106/291 |
| 3,788,871 | 1/1974 | Mullio | 106/291 |
| 3,822,141 | 7/1974 | Kaufman | 106/291 |

*Primary Examiner*—Winston A. Douglas
*Assistant Examiner*—J. V. Howard
*Attorney, Agent, or Firm*—Ostrolenk, Faber, Gerb & Soffen

[57] ABSTRACT

Bismuth oxychloride-mica nacreous pigments are improved in luster by the deposit of hydrous titanium hydroxide. Depending on the amount of hydrous titanium hydroxide deposited, the nacreous pigment can also exhibit improved aqueous-organic phase transferability.

12 Claims, No Drawings

BISMUTH OXYCHLORIDE-MICA NACREOUS PIGMENTS WITH ENHANCED LUSTER AND DISPERSIBILITY

This is a continuation of application Ser. No. 449,032, filed Mar. 7, 1974, now abandoned.

BACKGROUND OF THE INVENTION

Nacreous or pearlescent pigments are lamellar or plate-like pigments which impart a pearly or nacreous luster to objects on which or in which they are used. Natural pearl essence, a mixture of guanine and hypoxanthine obtained from the scales of fish, has long been used in cosmetic formulations. Synthetic nacreous pigments developed for cosmetic use include bismuth oxychloride, bismuth oxychloride-mica and titania coated mica. The bismuth oxychloride-mica powders have the advantage of softness, good compressibility and high luster.

Bismuth oxychloride-mica pigments are made by precipitating bismuth oxychloride crystals in the presence of mica. In general terms, this is accomplished by hydrolyzing a soluble bismuth compound in an aqueous slurry of mica. While there are a number of ways of accomplishing this, a preferred procedure is to first prepare an acidic slurry of wet ground mica to which is added a solution of a soluble bismuth salt. The bismuth compound hydrolyses to form a bismuth oxychloride precipitate. The acidity of the system is maintained by adding a solution of a base, such as sodium hydroxide, for neutralization of the acid formed by the hydrolysis reaction. The amount of the bismuth solution is controlled so as to obtain the desired ratio of BiOCl to mica, generally in the range of 1:4 to 4:1, preferably 1:1.5 to 1.5:1.

The pigment is concentrated from the aqueous slurry, for instance, by filtration, and is usually washed free of salt with water, ethanol, or the like.

The BiOCl-mica pigments are further processed to various types of finished products. In one case, the filter cake of pigment is dried to a powder with or without an added dispersing agent. BiOCl-mica, and indeed many nacreous pigments, are often processed to a paste or suspension. A wet form helps to keep the crystals dispersed and unagglomerated. In a typical case, the BiOCl-mica filter cake is flushed with an oil, such as castor oil or mineral oil. During this flushing operation, the pigment, originally wet with water, is transferred to pigment wet with oil and the water is expelled as a second phase which can be removed either by decanting or by drying under vacuum or by a combination of these techniques.

A flushing of BiOCl-mica pigments is complicated by the surface properties of the pigment. The acidic, aqueous slurry of BiOCl-mica pigment is usually neutralized to at least some extent in order to avoid equipment corrosion problems. If the neutralization is only carried out to a pH of 2.5–3.5 before filtering, the surface of the pigment is hydrophilic making the transfer of the pigment from the aqueous to the organic phase very difficult and often impossible. If the pH is raised to 4.0 or above, the surface of the pigment tends to be somewhat less hydrophilic and the transfer to the organic phase is clean. Unfortunately, some iron ions are present in the final pigment slurry due to the dissolution of iron from the mica during the precipitation of the bismuth oxychloride, and the iron tends to precipitate if the pH is raised above about 3.5. The precipitated iron hydroxide gives the pigment a yellow discoloration, which is objectionable for some uses.

A treatment has now been discovered which enhances the luster of the BiOCl-mica nacreous pigment. It has further been discovered that depending upon the amount of treating agent and the degree of neutralization, the transferability from aqueous to organic phase can be easily and cleanly accomplished. For example, in accordance with the present invention the pigment in the filter cake can be transferred to the organic phase even when the pH has only been increased to about 2.5–3.0. In other words, it is possible to obtain a good flush to the organic phase while keeping the near-white color of the pigment.

Accordingly, it is the object of the present invention to provide a process for treating BiOCl-mica nacreous pigments which will enhance the luster of the pearlescent material and also enhance the aqueous-organic phase transferability of the pigment at a sufficiently low pH to avoid the concurrent precipitation of discoloring iron hydroxide. This and other objects of the invention will become apparent to those skilled in the art from the following detailed description.

SUMMARY OF THE INVENTION

This invention relates to BiOCl-mica nacreous pigments with enhanced luster and dispersibility and more particularly relates to BiOCl-mica pigments which have these properties enhanced by the deposit of hydrous titanium hydroxide.

DESCRIPTION OF THE PREFERRED EMBODIMENTS

In accordance with this invention, BiOCl-mica nacreous pigments are improved by the deposit of hydrous titanium hydroxide. In the preferred embodiment of the invention, the treating process is carried out at the completion of the hydrolysis reaction which forms the bismuth oxychloride crystals.

The bismuth oxychloride-mica nacreous pigments are prepared in any convenient manner. In general, this is accomplished by adding a soluble bismuth compound and a source of chloride ions to an aqueous slurry of mica. Any soluble bismuth compound can be used and bismuth nitrate is the compound most often employed. To prevent premature hydrolysis and precipitation of insoluble bismuth compounds, a compatible mineral or other strong acid is added to both the bismuth salt solution and to the mica slurry. Hydrochloric acid or a mixture of hydrochloric and nitric acids is convenient since it also serves as a source of the chloride ions. Hydrolysis of the bismuth compound is controlled by maintaining the acidity within desired limits by adding base to neutralize the acid which also forms during the hydrolysis reaction. The base used is conveniently an alkali metal hydroxide; however, other soluble sources of hydroxyl ions such as a strongly basic amine or a base precursor such as urea can also be used. The pH of the acidic slurry is usually controlled in the neighborhood of about 1 during the precipitation.

The temperature at which the preparation of the BiOCl-mica pigment is effected is not critical and any convenient temperature conditions can be employed. It is generally preferred to use an elevated temperature of about 50°–100° C., preferably 60°–80° C.

Preferably a solution of the soluble bismuth salt and a solution of the base are simultaneously pumped into the acidic slurry of wet ground mica. The amount of bismuth solution is controlled so as to end up with the desired ratio of BiOCl to mica, generally in the range of 1:4 to 4:1, preferably 1:1.5 to 1.5:1. Although not preferred, the amount of bismuth solution can be controlled over a much broader range such that the BiOCl will comprise 20–80% by weight of the BiOCl-mica pigment.

In the next step of the preferred process of this invention, a relatively small amount of a solution of a titanium salt is added to the acidic slurry of BiOCl-mica. While it is possible to use any soluble titanium salt, solutions of titanium chloride or titanium sulfate, the two most common, relatively stable salts of titanium, are preferably used. It is generally recognized that the chemical species present in these solutions is the titanyl, $TiO^{+2}$, ion which is probably at least partially complexed with $OH^-$, $Cl^-$, or $SO_4^{--}$ anions. Following the addition of the titanyl salt solution, the acidity of the slurry is reduced to a point where the titanium is essentially completely precipitated from the solution as a hydrous titanium hydroxide.

The amount of titanium hydroxide incorporated in the final pigment can be quite low and the benefits of this invention will still be obtained. Improved properties have routinely been observed where as little as 1500–2500 ppm of the hydrous titanium compound (calculated as $TiO_2$) has been added to the pigment. As a practical matter, about 1000 ppm would appear to be the lower limit. The upper limit is not clear cut since some of the advantages persist even with several percent of the hydrous titanium hydroxide. However, in lacquer dispersions, for example, a haziness due to free particles of titanium hydroxide begins to become evident when too much titanium hydroxide is precipitated. Again, as a practical matter, it is unlikely that additions of the titanyl salt above 1% will be utilized. In general, an amount of soluble titanium salt will be used sufficient to provide about 1000–5000, preferably 1500–3600, parts of the hydrous titanium hydroxide (calculated as $TiO_2$) per million parts of the BiOCl-mica pigment.

The soluble titanium is precipitated as the hydrous titanium hydroxide by neutralizing the acidic pigment slurry to a pH in the range of about 2–3.5. Preferably, neutralization changes the pH of the slurry to about 2.3–3.0. The alkali metal hydroxides and particularly sodium hydroxide are the neutralizing agents preferred for use in this process.

The temperature at which the performance of the titanium hydrolysis step is effected is not critical and any convenient temperature conditions can be employed. It is generally most convenient to use the same temperatures as were used in the pigment precipitation step.

Instead of adding the titanium salt at the end of the bismuth oxychloride precipitation, the titanium salt can also be added simultaneously with the bismuth salt which is added to the mica slurry for preparing the BiOCl-mica pigment. The titanium appears to remain soluble until the aqueous slurry is neutralized to a sufficient extent, generally about pH 2.5, at the end of the BiOCl precipitation. This procedure is not preferred compared to the post-addition procedure discussed above.

Following the end of the hydrous titanium hydroxide precipitation, the nacreous pigment is washed relatively free of the salt solution which forms during the hydrolysis reaction. This can be accomplished in a number of ways or combination of ways. For example, the pigment can be filtered from the mother liquor and then washed free of residual salt. Alternatively, a settling and decanting procedure can be used.

The resulting hydrous titanium hydroxide containing BiOCl-mica nacreous pigments are thereafter processed in the conventional manner to various types of finished products. In one case, the filter cake of pigment is dried to yield a powder product either with or without an added dispersing agent. The dispersing agents are conventional and do not form a part of this invention. Typical agents include the polyoxyethylene derivatives of sorbitan monolaurate and sorbitan monooleate.

The dried powder product prepared in accordance with this invention has improved product qualities. When a quantity of the powder is smeared on the skin, for instance, the titanium hydroxide treated powder has a more lustrous appearance. If the powder is dispersed in a nitrocellulose lacquer and spread on a surface, a higher degree of reflectivity, a brighter appearance and a better coverage over the surface is obtained compared to BiOCl-mica powders which have not been subjected to the titanium treatment. It should be pointed out that rather mild drying conditions (about 100° C.) are used in preparing the powder and while these conditions may partially remove some of the hydrated water, they are not strong enough to dehydrate the titanium hydroxide. Thus, titanium dioxide is not formed and is not responsible for the improvements observed.

Alternatively, the nacreous pigment filter cake can be flushed with an oil, such as castor oil or mineral oil. During the flushing operation, the pigment originally wet with water is transferred to a pigment wet with oil and the water is expelled as a second phase which can be removed either by decanting or by drying under vacuum or by a combination of these techniques.

The enhanced ability to flush the pigments of the instant invention into an organic phase indicates that the titanium hydroxide treatment does affect the surface properties of the BiOCl-mica pigment. It is believed that the titanium hydroxide precipitates onto the surface of the pigment particles. However, due to the small amount of titanium hydroxide which is precipitated and the low refractive index of the hydrous hydroxide, it has not yet been ascertained just where the titanium hydroxide does precipitate. Based on the change in properties of the pigment, it seems reasonable to assume that the hydroxide precipitates as a thin coating over the pigment particle. In any event, the titanium treatment changes the nature of the surface and also effects some change in the agglomeration of one particle to another. Either a decrease in the actual particle-to-particle agglomeration or a lessening of the force between the agglomerated particles appears to be occurring. This leads to a better dispersion of the pigment in its end use formulation and hence tends to improve the coverage and the luster of the final product.

In order to more fully illustrate the present invention, the following non-limiting examples have been set forth. Unless otherwise indicated, all temperatures are in degrees centigrade and all parts and percentages are by weight throughout this specification and claims.

EXAMPLE 1

62.5 g of mica were slurried into 2500 ml of demineralized water. 33 ml of concentrated hydrochloric acid were added to bring the reservoir acidity to a pH of about 1. A feed solution was prepared by mixing 4 ml of an aqueous $TiCl_4$ solution (11.9 g $TiO_2$/100ml) and 496 ml of an aqueous bismuth solution (0.206 g Bi/ml) containing about a 6 normal mixture of hydrochloric and nitric acids. The reservoir containing the acidic slurry of mica was heated to 70° C. and 245 ml of the feed solution was pumped into the reservoir at a rate of about 4.5 ml/min. Simultaneously, 6 N sodium hydroxide was pumped into the reservoir at about the same rate. The amount of bismuth compound being added was sufficient to give a 1:1 ratio of BiOCl:mica and the amount of titanium used was roughly 3900 ppm of the BiOCl-mica pigment. After about 55 minutes, all of the bismuth feed solution had been added. Introduction of the sodium hydroxide into the reservoir was then continued until the pH of the aqueous slurry had been raised to 2.3. The resulting pigment was then isolated by filtration on a Büchner type filter and washed thoroughly with water.

A portion of the filter cake was dried and mixed with 2% of a fatty acid ester of polyoxyethylene glycol as a non-ionic surfactant. The resulting dry powder was then dispersed to a 3.5% concentration in a nitrocellulose lacquer of the following composition:

| | |
|---|---|
| nitrocellulose, RS type, 15-20 sec. | 2.9% |
| nitrocellulose, RS type, 30-40 sec. | 6.6% |
| isopropanol | 5.1% |
| amyl acetate | 44.8% |
| n-butyl acetate | 37.6% |
| monobutoxydiethylene glycol | 3.0% |

A "drawdown", a standard technique for evaluating nacreous pigments, was then made by spreading a pool of the lacquer dispersion on a black and white hiding power chart using a Bird Applicator designated as yielding a wet film thickness of 0.003 inch. The card was then allowed to rest in a horizontal position while the solvent evaporated and the film hardened. A control run following the above procedure, but without the titanium chloride in the bismuth feed solution, was performed and a drawdown of the resulting pigment was also made. The luster of the pigment treated in accordance with this invention was noticeably more lustrous than that of the control run. The luster was also evaluated on a Gardner Laboratory "TV" 35° Glossmeter and a value of 64 was obtained with the inventive pigment versus a value of 53 for the control procedure.

EXAMPLE 2

62.5 g of mica were slurried into 2500 ml of demineralized water, HCl was added to bring the pH to <1, and the slurry was heated to 70° C. 244 ml of an aqueous solution of bismuth nitrate in hydrochloic acid (20.6 g $Bi^{+3}$/liter; ca 6 N acid) were pumped into the slurry, with stirring, over a 54 minute period. Simultaneously, 237 ml of 6 N sodium hydroxide solution was pumped into the reactor. The pH at the end of the bismuth oxychloride hydrolysis step was 1.4.

1 ml of a titanyl chloride solution, containing 11.9 g of $TiO_2$ per 100 ml, was introduced into the reactor and stirred for about 2 minutes. The pigment slurry was then neutralized with sodium hydroxide to a pH of 2.3. The slurry was then cooled, filtered and washed with water. The amount of titanium salt used was sufficient to provide roughly 1000 parts of hydrous titanium hydroxide (calculated as $TiO_2$) per million parts of BiOCl-mica pigment.

A dry powder formulation and a nitrocellulose drawdown were made as described in Example 1. The product had a drawdown luster of 62 on the Glossmeter. A control run which was made following the foregoing procedure, but omitting the titanium post-treatment, resulted in a Glossmeter reading of 53.

EXAMPLE 3

2.5 kg of mica were slurried into 100 liters of water in a reservoir which was then acidified with about 1500 ml of 10 N hydrochloric acid. A bismuth-HCl solution, containing 20.3 g Bi/100 ml and acidity equal to 5.8 N, and a solution of 6.1 N sodium hydroxide were pumped into the reservoir over a period of about 75 minutes. The reservoir was neutralized to pH 2.3 with the sodium hydroxide solution.

2.25 liter aliquots of the pigment slurry were taken from the reservoir and a solution of a titanium salt added. The titanium salt added, the pH of the slurry upon addition, and the amount of titanium in parts per million calculated as titanium dioxide are shown in the following Table.

After addition of the titanium salt, the slurries were stirred for 5–15 minutes and then neutralized to pH 2.5 with sodium hydroxide. Each slurry was then allowed to settle, decanted, filtered and the filter cake washed thoroughly. An attempt was then made to flush a portion of each pigment into castor oil. Another portion of the filter cake was slurried with a solution of a sorbitan monostearate type dispersing agent (to give 2% surfactant in the dry product), dried in a vacuum oven and screened. Nitrocellulose drawdowns were prepared as described in Example 1 and Glossmeter readings were determined. The following Table also reports the results of the attempt to flush the pigment, and the Glossmeter readings.

TABLE

| titanium Salt | pH Upon Addition | ppm $TiO_2$ | Flush Obtained | $R_{gloss}$ Oil Base | $R_{gloss}$ Dry Powder |
|---|---|---|---|---|---|
| $TiCl_4$ | 0.8 | 1850 | Yes | 72 | — |
| $TiCl_4$ | 1.0 | 1500 | Yes | 73 | 66 |
| $TiCl_4$ | 1.0 | 2200 | Yes | 71 | — |
| $Ti(SO_4)_2$ | 0.8 | 3600 | Yes | 71 | 63 |
| No titanium treatment | | | No | — | 58 |
| No Ti treatment; slurry neutralized to pH 4.0 | | | Yes; yellow discoloration | 67 | 57 |

EXAMPLE 4

A slurry of 1:1 BiOCl-mica was prepared as described in the first paragraph of Example 3. A 10 liter aliquot was taken and heated to 77° C. 7.5 ml of a titanyl chloride solution (12.5 g $TiO_2$/100 ml) were added with stirring and stirring was continued for about 20 minutes. The slurry was then neutralized with sodium hydroxide to pH 2.3, filtered on a Büchner funnel and washed with water. The amount of titanium solution added was such as to give a titanium hydroxide content (as TiO$_2$) equivalent to 2200 ppm. A good flush into castor oil was obtained as shown by the "breaking out" of the water phase. The oil base pigment was dried at about 85° C. in a vacuum oven and after drying, the pigment content was reduced to about 70% with castor oil.

A drawdown was made as described in Example 1 and a Glossmeter reading of 72 was observed.

The Table in Example 3 shows that a pigment prepared without the titanium treatment could be flushed into castor oil if the slurry was neutralized to pH 4. When such pigments are formulated into a drawdown similar to that described in the preceding paragraph, the Glossmeter luster reading is about 60–68.

EXAMPLE 5

Following a procedure similar to that of Example 3, a series of runs were made preparing an acidic slurry of 1:1 BiOCl-mica. One of the series was then treated by adding an amount of aqueous titanyl chloride solution (to give a titanium hydroxide equivalent to 2500 ppm TiO$_2$) over a 6 minute period, followed by mixing for about 5 minutes and then neutralizing with sodium hydroxide to pH 2.6. The others were directly neutralized to a pH of about 2.5–2.8.

The pigments produced in each of the runs of both series were allowed to settle, the supernate decanted, the pigment reslurried with water, again allowed to settle and most of the supernate was decanted. The thickened slurries were individually filtered and washed with water to remove residual salt. Each of the filter cakes contained about 50–70% total solids. Each cake was then reslurried with water to about 30% total solids and dried in a commercial spray drying unit.

Tests were then made on the dry powder products and showed that the luster of the pigment which had been treated with the titanium hydroxide was superior to that of the untreated pigment. When the dry powder was dispersed at 3.5% in a nitrocellulose lacquer and a drawdown made, the treated pigment gave an average Glossmeter reading of 51 while the average of the untreated pigment was about 45.

EXAMPLE 6

A slurry of mica and water was prepared containing about 62 g mica per liter. This was acidified with hydrochloric acid to pH 0.9 and heated to 65° C. Over a one hour period of time, about 155 ml of bismuth solution (see Example 3) and about 150 ml of 6 N sodium hydroxide solution were pumped into the reactor per liter of mica slurry in the reactor.

The final slurry of 60:40 BiOCl:mica pigment was divided into two parts. The first was neutralized to pH about 2.7. To the second was added 1 ml of titanyl chloride solution (11.9 g TiO$_2$/100 ml) per liter of slurry and then neutralized to pH about 2.7. Each of the pigment slurries were then filtered and washed well with water. The aqueous pigment paste was mixed with about 2% of a dispersing agent, then dried and screened.

The dry powders were dispersed in the nitrocellulose lacquer and a drawdown was made of one material next to the other. The luster and coverage of the pigment treated in accordance with this invention was obviously better.

Various changes and modifications can be made in the process and products of this invention without departing from the spirit and the scope thereof. The various embodiments set forth herein were presented for the purpose of further illustrating the invention but were not intended to limit it.

What is claimed is:

1. A hydrous titanium hydroxide-containing bismuth oxychloride-mica nacreous pigment wherein the amount of hydrous titanium hydroxide, calculated as TiO$_2$, is about 1000–5000 ppm parts of the BiOCl-mica.

2. The pigment of claim 1 wherein the hydrous titanium hydroxide is about 1300–5000 ppm.

3. The pigment of claim 1 wherein the hydrous titanium hydroxide is about 1500–3600 ppm.

4. The pigment of claim 1 wherein the weight ratio of bismuth oxychloride to mica is 4:1 to 1:4.

5. The pigment of claim 1 wherein the weight ratio of bismuth oxychloride to mica is 1.5:1 to 1:1.5.

6. The pigment of claim 1 wherein the weight ratio of BiOCl to mica is 1:1.

7. In a method of preparing a BiOCl-mica nacreous pigment by hydrolyzing a soluble bismuth compound in an acidic aqueous slurry of mica in the presence of chloride ions, the improvement which comprises depositing hydrous titanium hydroxide thereto after hydrolyzation of the bismuth to bismuth oxychloride wherein the amount of hydrous titanium hydroxide, calculated at TiO$_2$, is about 1000–5000 ppm parts of the BiOCl-mica.

8. The process of claim 7 wherein the titanium is added in the form of a solution of a soluble titanium compound and is thereafter hydrolyzed to hydrous titanium hydroxide.

9. The process of claim 8 wherein the titanium compound is titanium chloride or titanyl sulfate.

10. The process of claim 8 wherein the titanium is hydrolyzed by neutralization to a pH of 2–3.5.

11. The process of claim 10 wherein the neutralization is to a pH of 2.3–3.0.

12. The process of claim 7 wherein the hydrous titanium hydroxide is employed in an amount, calculated as TiO$_2$, of 1500–3600 ppm parts pigment.

* * * * *